(12) United States Patent
Ando

(10) Patent No.: US 12,095,213 B2
(45) Date of Patent: Sep. 17, 2024

(54) CONNECTION TERMINAL AND WIRING HARNESS

(71) Applicant: SUMITOMO WIRING SYSTEMS, LTD., Mie (JP)

(72) Inventor: Motohiro Ando, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 338 days.

(21) Appl. No.: 17/621,415

(22) PCT Filed: Jun. 19, 2020

(86) PCT No.: PCT/JP2020/024184
§ 371 (c)(1),
(2) Date: Dec. 21, 2021

(87) PCT Pub. No.: WO2021/002222
PCT Pub. Date: Jan. 7, 2021

(65) Prior Publication Data
US 2022/0359997 A1 Nov. 10, 2022

(30) Foreign Application Priority Data
Jul. 4, 2019 (JP) .................................. 2019-124939

(51) Int. Cl.
H01R 4/72 (2006.01)
H01R 11/12 (2006.01)
(Continued)

(52) U.S. Cl.
CPC ............... H01R 4/72 (2013.01); H01R 11/12 (2013.01); B60R 16/0215 (2013.01); H01R 4/023 (2013.01); H01R 2201/26 (2013.01)

(58) Field of Classification Search
CPC .......... H01R 4/72; H01R 11/12; H01R 4/023; H01R 2201/26; H01R 4/029;
(Continued)

(56) References Cited

U.S. PATENT DOCUMENTS 6,224,428 B1 * 5/2001 Chen .................. H01R 33/9655
439/918
8,951,063 B2 * 2/2015 Iio ...................... H01R 13/5216
439/523

(Continued)

FOREIGN PATENT DOCUMENTS

JP H10-289745 A 10/1998
JP 2015-049956 A 3/2015
(Continued)

OTHER PUBLICATIONS

International Search Report issued on Sep. 8, 2020 for WO 2021/002222 A1 (4 pages).

Primary Examiner — Travis S Chambers
(74) Attorney, Agent, or Firm — Venjuris, P.C.

(57) ABSTRACT

A wiring harness is provided with a wire including a core and an insulation coating covering an outer periphery of the core, a connection terminal to be electrically connected to the core exposed from the insulation coating, and a tubular shrinkable tube. The connection terminal includes a wire connecting portion to be electrically connected to the core of the wire, a terminal connecting portion to be connected to a mating terminal, and an intermediate coupling portion provided between the wire connecting portion and the terminal connecting portion and configured to link the wire connecting portion and the terminal connecting portion. The shrinkable tube includes a heat shrinkable tube and an adhesive formed on an inner peripheral surface of the heat shrinkable tube. The intermediate coupling portion includes groove (Continued)

portions formed in both upper and lower surfaces of a part exposed from the heat shrinkable tube.

<div style="text-align:center">13 Claims, 7 Drawing Sheets</div>

(51) Int. Cl.
    *B60R 16/02*     (2006.01)
    *H01R 4/02*     (2006.01)

(58) Field of Classification Search
    CPC ...... H01R 43/0207; H01R 4/027; H01R 4/02; H01R 4/70; B60R 16/0215
    See application file for complete search history.

(56) References Cited

U.S. PATENT DOCUMENTS

| | | | |
|---|---|---|---|
| 10,770,856 B2 * | 9/2020 | Eder | H01R 13/02 |
| 2014/0230996 A1 | 8/2014 | Saito | |
| 2015/0244159 A1 * | 8/2015 | Seifert | H02G 15/04 174/77 R |

FOREIGN PATENT DOCUMENTS

| | | | |
|---|---|---|---|
| JP | 2017-027884 A | 2/2017 |
| JP | 2017-054665 A | 3/2017 |
| JP | 2017-103073 A | 6/2017 |

* cited by examiner

CONNECTION TERMINAL AND WIRING HARNESS

CROSS REFERENCE TO RELATED APPLICATIONS

This application is a national phase of PCT application No. PCT/JP2020/024184, filed on 19 Jun. 2020, which claims priority from Japanese patent application No. 2019-124939, filed on 4 Jul. 2019, all of which are incorporated herein by reference.

TECHNICAL FIELD

The present disclosure relates to a connection terminal and a wiring harness.

BACKGROUND

Conventionally, an end part of a core of a coated wire and a connection terminal made of metal are electrically connected in a known wiring harness used in a vehicle (see, for example, Patent Document 1). In the wiring harness of this type, a connected part of the core and the connection terminal is covered by a heat shrinkable tube to insulate and protect the connected part. Further, an adhesive is provided inside the heat shrinkable tube and filled into between the connected part of the core and the connection terminal and the heat shrinkable tube when the heat shrinkable tube is thermally shrunk by heating.

PRIOR ART DOCUMENT

Patent Document

Patent Document 1: JP 2013-114936 A

SUMMARY OF THE INVENTION

Problems to be Solved

The above connection terminal is provided with a terminal connecting portion to be exposed from the heat shrinkable tube and connected to a mating terminal. However, if the adhesive provided inside the heat shrinkable tube flows out to the outside of the heat shrinkable tube, that adhesive may spread to the terminal connecting portion. If the adhesive spreads to the terminal connecting portion, a problem of reducing the connection reliability of the terminal connecting portion and the mating terminal arises.

The present disclosure aims to provide a connection terminal and a wiring harness capable of suppressing a reduction in connection reliability with a mating terminal.

Means to Solve the Problem

The present disclosure is directed to a connection terminal with a wire connecting portion to be electrically connected to a wire, a terminal connecting portion to be connected to a mating terminal, and an intermediate coupling portion provided between the wire connecting portion and the terminal connecting portion, the intermediate coupling portion linking the wire connecting portion and the terminal connecting portion, the intermediate coupling portion including groove portions formed in both upper and lower surfaces of a part closer to the terminal connecting portion than the wire connecting portion.

Effect of the Invention

According to the connection terminal of the present disclosure, an effect of being capable of reducing connection reliability with the mating terminal is achieved.

DETAILED DESCRIPTION TO EXECUTE THE INVENTION

Description of Embodiments of Present Disclosure

Figure 1:
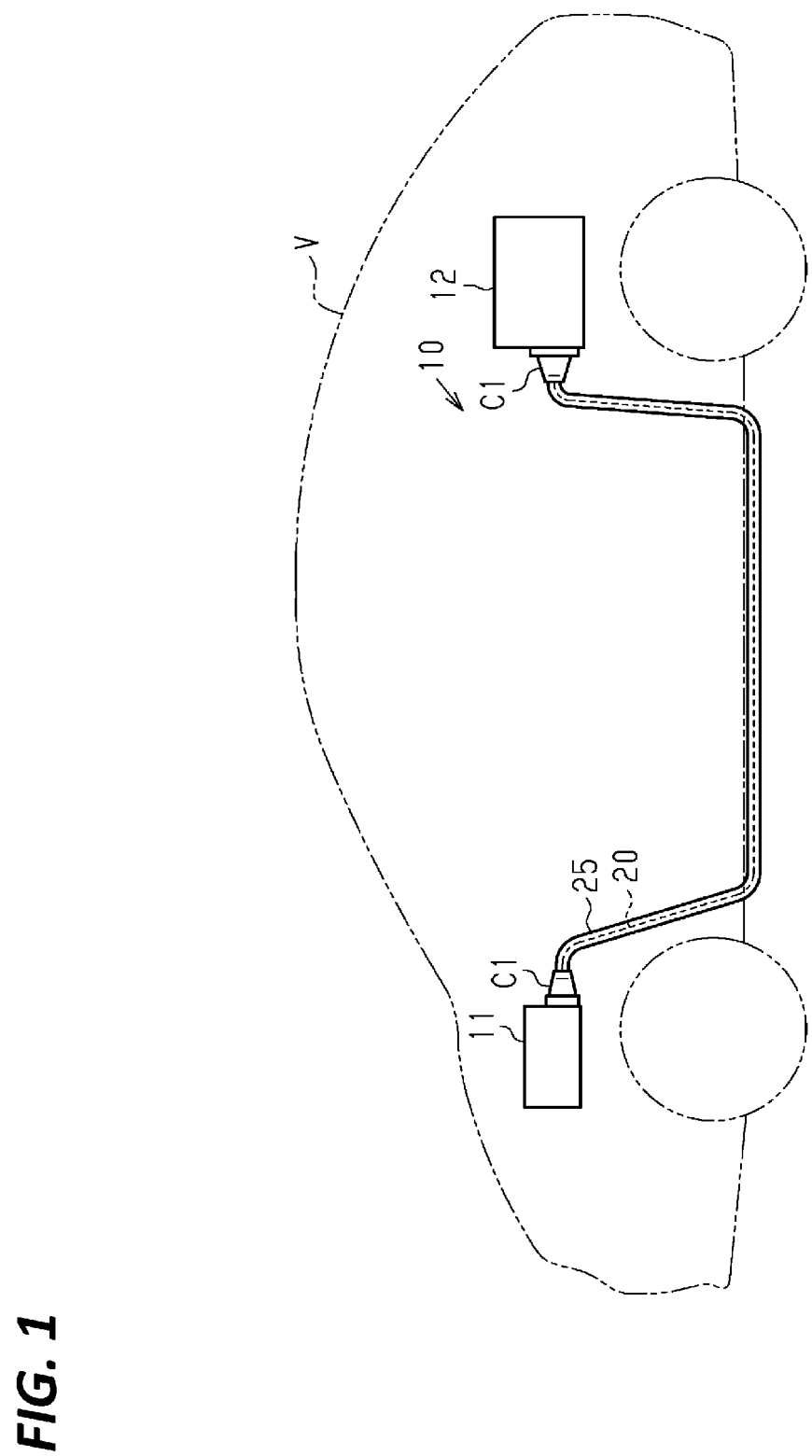
FIG. 1 is a schematic configuration diagram showing a wiring harness of one embodiment.

First, embodiments of the present disclosure are listed and described.

[1] The connection terminal of the present disclosure includes a wire connecting portion to be electrically connected to a wire, a terminal connecting portion to be connected to a mating terminal, and an intermediate coupling portion provided between the wire connecting portion and the terminal connecting portion, the intermediate coupling portion linking the wire connecting portion and the terminal connecting portion, the intermediate coupling portion including groove portions formed in both upper and lower surfaces of a part closer to the terminal connecting portion than the wire connecting portion.

According to this configuration, the groove portions are formed in the both upper and lower surfaces of the intermediate coupling portion provided between the wire connecting portion and the terminal connecting portion. In this way, the flowing out adhesive can be pooled in the groove portions and the flow of the adhesive can be blocked by those groove portions, for example, if the shrinkable tube is mounted on the connection terminal and the adhesive flows out from the shrinkable tube. In this way, the flow of the adhesive to the terminal connecting portion can be suppressed. As a result, a reduction in the connection reliability of the terminal connecting portion and the male terminal can be suppressed.

[2] Preferably, the groove portions include a first groove portion formed in the upper surface of the intermediate coupling portion and a second groove portion formed in the lower surface of the intermediate coupling portion, and the first and second groove portions are formed to overlap each other in a plan view from a normal direction to the upper surface of the intermediate coupling portion.

According to this configuration, the flow of the adhesive can be blocked by the first and second groove portions formed at the positions overlapping each other in the plan view. Thus, the flow of the adhesive can be blocked at the same position on the both upper and lower surfaces of the intermediate coupling portion in the plan view.

[3] Preferably, the groove portions are formed to extend over an entire length of the intermediate coupling portion in a width direction orthogonal to a longitudinal direction as an arrangement direction of the wire connecting portion, the intermediate coupling portion and the terminal connecting portion in a plan view.

According to this configuration, the flow of the adhesive can be blocked over the entire length in the width direction of the intermediate coupling portion by the groove portions. In this way, the flow of the adhesive to the terminal connecting portion can be suitably suppressed.

[4] A wiring harness includes the connection terminal of any one of [1] to [3] described above, a wire having a core and an insulation coating covering an outer periphery of the core, and a tubular shrinkable tube for covering a connected part of the wire and the connection terminal, wherein the shrinkable tube includes a heat shrinkable tube and an adhesive formed on an inner peripheral surface of the heat shrinkable tube, the core exposed form the insulation coating is electrically connected to the wire connecting portion, and the groove portions are formed in both upper and lower surfaces of a part of the intermediate coupling portion exposed from the heat shrinkable tube.

According to this configuration, if the adhesive flows out from the shrinkable tube covering the connected part of the wire connecting portion and the core, the flowing out adhesive can be pooled in the groove portions and the flow of the adhesive can be blocked by those groove portions. In this way, the flow of the adhesive to the terminal connecting portion can be suppressed. As a result, a reduction in the connection reliability of the terminal connecting portion and the male terminal can be suppressed.

[5] Preferably, the intermediate coupling portion includes a groove-like positioning mark provided to position a tip of the heat shrinkable tube, and the groove portions are provided closer to the terminal connecting portion than the positioning mark.

According to this configuration, when the heat shrinkable tube is mounted on the connection terminal and the wire, the tip of the heat shrinkable tube can be easily positioned by aligning the heat shrinkable tube using the positioning mark. Further, since the groove portions are provided closer to the terminal connecting portion than the positioning mark, the flow of the adhesive flowing out from the tip of the heat shrinkable tube can be suitably blocked by the groove portions.

[6] Preferably, the groove portions are formed to be deeper than the positioning mark. According to this configuration, since the groove portions are formed to be deep, the flow of the adhesive can be suitably blocked by those groove portions.

[7] When an arrangement direction of the wire connecting portion, the intermediate coupling portion and the terminal connecting portion is a longitudinal direction, dimensions along the longitudinal direction of the groove portions are set larger than a dimension along the longitudinal direction of the positioning mark. According to this configuration, since the groove portions are formed to be wide, the flow of the adhesive can be suitably blocked by those groove portions.

[8] When the arrangement direction of the wire connecting portion, the intermediate coupling portion and the terminal connecting portion is the longitudinal direction and a direction orthogonal to the longitudinal direction in a plan view is a width direction, a dimension along the width direction of the positioning mark is set smaller than dimensions along the width direction of the groove portions. According to this configuration, the dimensions along the width direction of the groove portions and the dimension along the width direction of the positioning mark are different from each other. Thus, the groove portions and the positioning mark can be easily distinguished.

[9] The intermediate coupling portion has a side surface extending between the upper and lower surfaces, a first inclined surface inclined downward from an inner side toward an outer side in the width direction of the intermediate coupling portion is formed on a corner part between the upper surface and the side surface of the intermediate coupling portion, a second inclined surface inclined upward from the inner side toward the outer side in the width direction of the intermediate coupling portion is formed on a corner part between the lower surface and the side surface of the intermediate coupling portion, and the first and second inclined surfaces are formed to extend from the groove portions toward wire connecting portion.

According to this configuration, by forming the first and second inclined surfaces on the corner parts of the intermediate coupling portion, the adhesive more easily spreads on the first and second inclined surfaces as compared to corner parts not formed with the first and second inclined surfaces. In this way, the adhesive held back in the groove portions can be spread toward the wire connecting portion through the first and second inclined surfaces. Therefore, the flow of the adhesive to the terminal connecting portion can be suitably suppressed.

[10] The wire is a high-voltage wire, and the core and the wire connecting portion are joined by ultrasonic welding. According to this configuration, the flow of the adhesive to the terminal connecting portion can be suitably suppressed even if the wire is the high-voltage wire, and the core of the wire and the wire connecting portion are joined by ultrasonic welding.

Details of Embodiment of Present Disclosure

Specific examples of a connection terminal and a wiring harness of the present disclosure are described below with reference to the drawings. In each figure, some of components may be shown in an exaggerated or simplified manner for the convenience of description. Further, a dimension ratio of each part may be different in each figure. "Parallel" and "orthogonal" in this specification mean not only strictly parallel and orthogonal, but also substantially parallel and orthogonal within a range in which functions and effects in the embodiment are achieved. Note that the present invention is not limited to these illustrations and is intended to be represented by claims and include all changes in the scope of claims and in the meaning and scope of equivalents.

A wiring harness 10 shown in FIG. 1 electrically connects two, three or more electrical devices (devices). The wiring harness 10 is, for example, installed in a vehicle V such as a hybrid or electric vehicle. The wiring harness 10 electrically connects an inverter 11 disposed in a front part of the vehicle V and a high-voltage battery 12 disposed behind the inverter 11 in the vehicle V. The wiring harness 10 is, for example, routed to pass below a floor or the like of the vehicle. The inverter 11 is connected to a motor (not shown) for wheel drive serving as a power source for vehicle travel. The inverter 11 generates alternating current power from direct current power of the high-voltage battery 12 and supplies that alternating current power to the motor. The high-voltage battery 12 is, for example, a battery capable of supplying a voltage of several hundreds of volts.

The wiring harness 10 includes one or more wires 20, a pair of connectors C1 mounted on both end parts of the wires 20, and an exterior member 25 collectively surrounding a plurality of the wires 20. One end part of the wire 20 is connected to the inverter 11 via the connector C1, and the other end part of the wire 20 is connected to the high-voltage battery 12 via the connector C1. The wire 20 is, for example, a high-voltage wire capable of dealing with high voltages/large currents. The wire 20 may be, for example, a shielded wire having an electromagnetic shield structure itself or a non-shielded wire having no electromagnetic shield itself.

The exterior member 25 has an elongated tube shape as a whole. The one or more wires 20 are accommodated in an internal space of the exterior member 25. The exterior member 25 is, for example, formed to surround the outer periphery of the plurality of wires 20 over the entire periphery in a circumferential direction. The exterior member 25 protects the wires 20 accommodated inside from flying objects and waterdrops. A pipe made of metal or resin, a protector made of resin, a flexible corrugated tube made of resin or the like, a waterproof cover made of rubber or a combination of these can be used as the exterior member 25.

(Configuration of Wire 20)

Figure 2A:
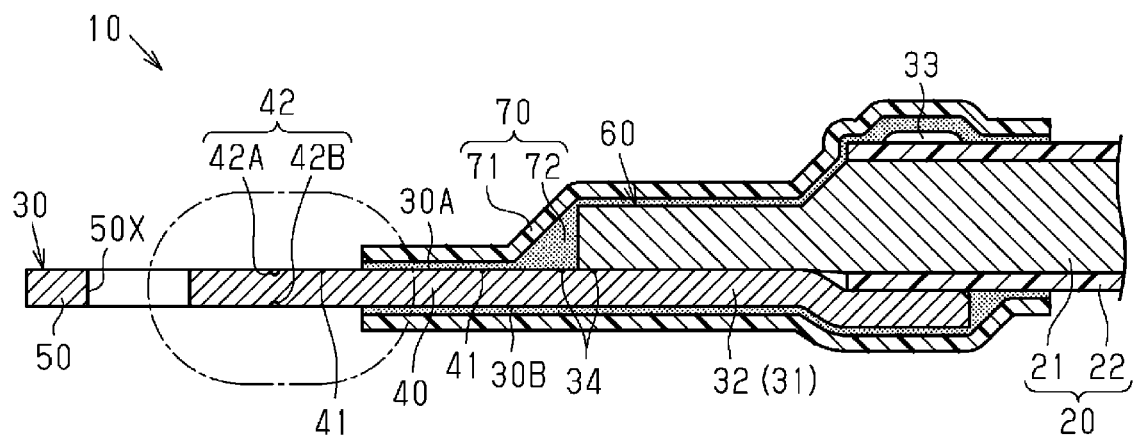
FIG. 2A is a schematic section showing the wiring harness of the one embodiment and FIG. 2B is an enlarged section enlargedly showing a part of the wiring harness shown in FIG. 2A.

As shown in FIG. 2A, the wire 20 includes a core 21 formed of a conductor, and an insulation coating 22 covering the outer periphery of the core 21. A stranded wire formed by twisting a plurality of metal strands, a columnar conductor formed of one columnar metal bar having a solid structure inside, a tubular conductor having a hollow structure inside or the like can be used as the core 21. Further, a combination of a stranded wire, a columnar conductor and/or a tubular conductor may be used as the core 21. Examples of the columnar conductor include a single core and a busbar. A copper-based or aluminum-based metal material can be, for example, used as a material of the core 21. The core 21 of this embodiment is a single core made of aluminum. The core 21 is, for example, formed by extrusion molding.

A cross-sectional shape of the core 21 cut along a plane orthogonal to a longitudinal direction of the core 21 can be an arbitrary shape. That is, a transverse cross-sectional shape of the core 21 can be an arbitrary shape. The transverse cross-sectional shape of the core 21 is, for example, a circular shape, a semicircular shape, a polygonal shape, a square shape or a flat shape. The transverse cross-sectional shape of the core 21 of this embodiment is a circular shape.

The insulation coating 22 covers, for example, the outer peripheral surface of the core 21 over the entire periphery in the circumferential direction. The insulation coating 22 is, for example, made of an insulating material such as synthetic resin. A synthetic resin containing, as a main component, a polyolefin-based resin such as cross-linked polyethylene or cross-linked polypropylene can be, for example, used as a material of the insulation coating 22. One material can be singly used or two or more materials can be appropriately combined and used as the material of the insulation coating 22. The insulation coating 22 can be, for example, formed by extrusion molding (extrusion coating) for the core 21.

Note that the "main component" in this specification means the inclusion of other components without hindering functions of the main component and the content thereof is 50 mass % or more unless otherwise particularly specified.

An end part of the core 21 is exposed from the insulation coating 22 in an end part of the wire 20. For example, in the end part of the wire 20, the insulation coating 22 of a given length from the end of the wire 20 is stripped to expose the end part of the core 21 from the insulation coating 22.

The wiring harness 10 includes a connection terminal 30 made of metal connected to the end part of the wire 20 and a shrinkable tube 70 for covering a connected part 60 of the wire 20 and the connection terminal 30.

(Configuration of Connection Terminal 30)

The connection terminal 30 includes a wire connecting portion 31 to be connected to the end part of the wire 20, an intermediate coupling portion 40 and a terminal connecting portion 50 to be connected to a mating terminal (not shown). The connection terminal 30 is, for example, a single component in which the wire connecting portion 31, the intermediate coupling portion 40 and the terminal connecting portion 50 are integrally connected. A metal material such as copper, copper alloy, aluminum, aluminum alloy or stainless steel can be, for example, used as a material of the connection terminal 30. Surface processing such as silver plating, tin plating or aluminum plating may be applied to the connection terminal 30 according to the type of the constituent metal and a use environment. The connection terminal 30 can be, for example, formed by press-working a metal plate excellent in conductivity. Note that examples of the mating terminal to be connected to the terminal connecting portion 50 include a busbar, a terminal portion of an electrical device and a terminal of another wire.

In the following description, an arrangement direction of the wire connecting portion 31, the intermediate coupling portion 40 and the terminal connecting portion 50 is referred to as a longitudinal direction of the connection terminal 30, a vertical direction of FIG. 2A, out of directions orthogonal to the longitudinal direction, is referred to a thickness direction of the connection terminal 30 and a direction orthogonal to both the longitudinal direction and the thickness direction is referred to as a width direction of the connection terminal 30.

Figure 3:
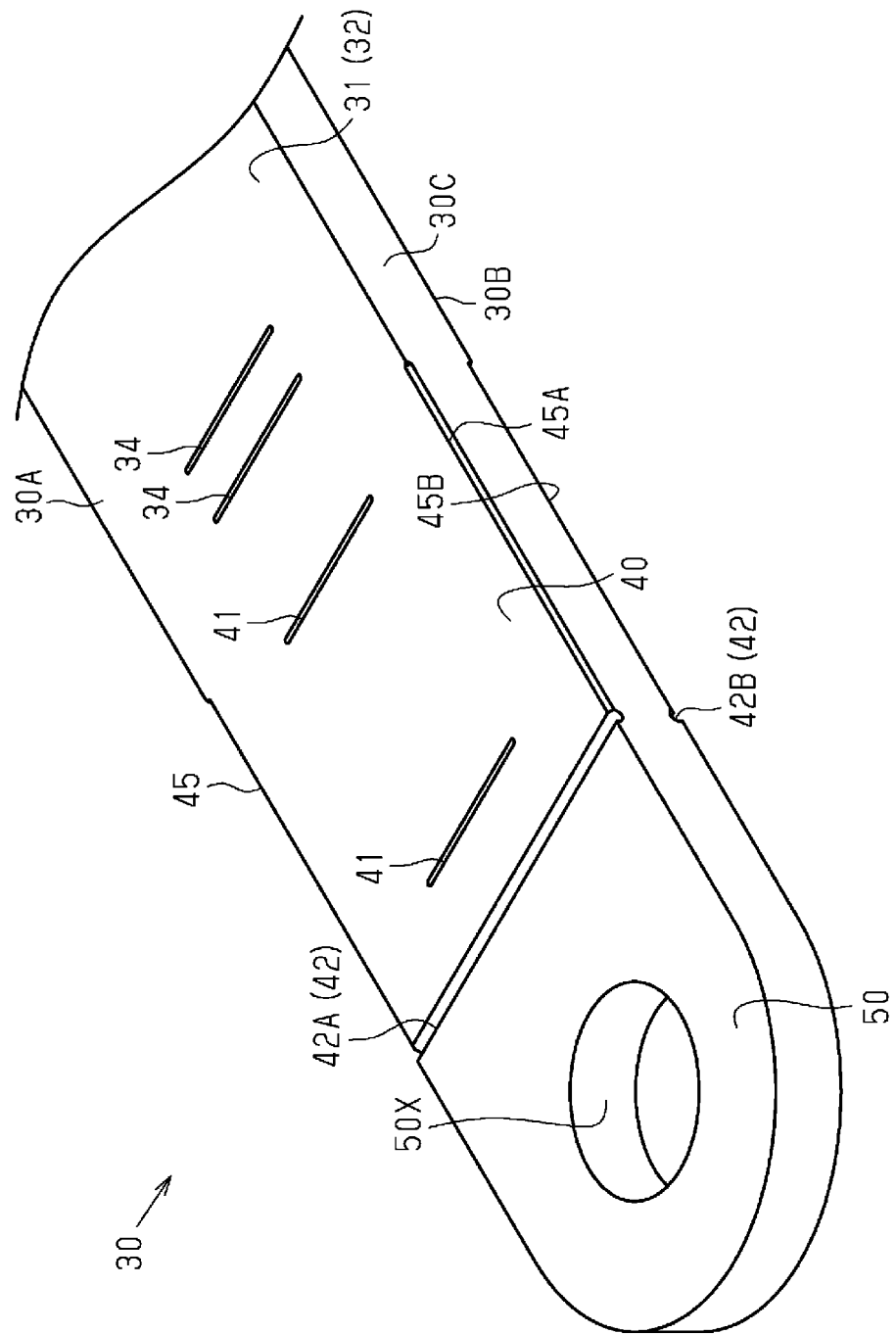
FIG. 3 is a schematic perspective view showing a connection terminal of the one embodiment.

As shown in FIG. 3, the connection terminal 30, i.e. the wire connecting portion 31, the intermediate coupling portion 40 and the terminal connecting portion 50, has an upper surface 30A, a lower surface 30B and side surfaces 30C provided between the upper and lower surfaces 30A, 30B.

(Configuration of Wire Connecting Portion 31)

As shown in FIG. 2A, the wire connecting portion 31 is electrically connected to the end part of the wire 20. The wire connecting portion 31 is, for example, electrically connected to the end part of the core 21 exposed from the insulation coating 22. The wire connecting portion 31 includes, for example, a strip-like base portion 32 and a pair of coating connecting portions 33 provided on both widthwise ends of the base portion 32.

(Configuration of Base Portion 32)

Figure 4:
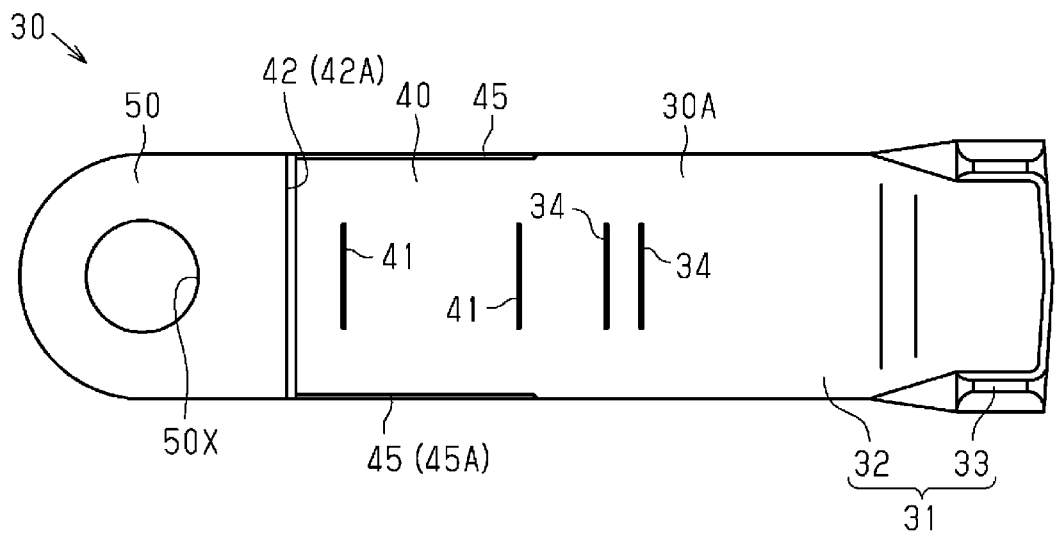
FIG. 4 is a schematic plan view of the connection terminal of the one embodiment.

As shown in FIGS. 3 and 4, the base portion 32 is, for example, formed into a strip shape extending in the longitudinal direction. The base portion 32 is in the form of a flat plate. A thickness of the base portion 32 can be, for example, about 2 mm to 3 mm. Groove-like positioning marks 34 for positioning the tip of the core 21 (see FIG. 2A) are, for example, formed in the upper surface 30A of the base portion 32. A plurality of (two in this embodiment) the positioning marks 34 are formed at a predetermined distance from each other in the longitudinal direction of the base portion 32. Each positioning mark 34 is, for example, formed to linearly extend along the width direction of the base portion 32. Each positioning mark 34 is, for example, formed to linearly extend in a widthwise part of the base portion 32. That is, a length in the width direction of each positioning mark 34 is set shorter than the entire length in the width direction of the base portion 32. The plurality of positioning marks 34 are, for example, formed to extend in parallel to each other. As shown in FIG. 2A, each positioning mark 34 is formed to be recessed downward from the upper surface 30A of the base portion 32. A depth of each positioning mark 34 can be, for example, about 0.1 mm to 0.2 mm.

The end part of the core 21 exposed from the insulation coating 22 is connected to the upper surface 30A of the base portion 32. At this time, the wire 20 is so positioned that the tip of the core 21 is arranged between the two positioning marks 34 in the longitudinal direction of the base portion 32. The tip of the core 21 is joined to the upper surface 30A of the base portion 32 of the wire connecting portion 31. The core 21 and the wire connecting portion 31 are joined, for example, by ultrasonic welding, resistance welding, soldering, crimping or the like. In this embodiment, the core 21 and the wire connecting portion 31 are connected by ultrasonic welding. For example, the wire 20 is a high-voltage wire. If a transverse cross-sectional area of the core 21 is large, the core 21 and the wire connecting portion 31 are preferably connected by ultrasonic welding.

(Configuration of Coating Connecting Portions 33)

As shown in FIG. 4, each coating connecting portion 33 is, for example, formed on an end part on a side opposite to the terminal connecting portion 50, out of end parts in the longitudinal direction of the base portion 32. The respective coating connecting portions 33 are formed to project upward from the upper surface 30A on both widthwise ends of the base portion 32.

As shown in FIG. 2A, the pair of coating connecting portions 33 are, for example, connected to an end part of the insulation coating 22 of the wire 20. For example, the pair of coating connecting portions 33 are crimped and fixed to the end part of the insulation coating 22 by being plastically deformed inwardly with the end part of the insulation coating 22 disposed between the pair of coating connecting portions 33.

(Configuration of Intermediate Coupling Portion 40)

The intermediate coupling portion 40 is provided between the base portion 32 of the wire connecting portion 31 and the terminal connecting portion 50 and formed to link the wire connecting portion 31 and the terminal connecting portion 50. The intermediate coupling portion 40 is, for example, formed continuously and integrally with the base portion 32 and formed continuously and integrally with the terminal connecting portion 50. The intermediate coupling portion 40 is, for example, formed such that a part thereof is exposed from the shrinkable tube 70 to project to the outside of the shrinkable tube 70.

As shown in FIGS. 3 and 4, the intermediate coupling portion 40 is, for example, formed into a strip shape extending in the longitudinal direction. The intermediate coupling portion 40 is, for example, in the form of a flat plate. A thickness of the intermediate coupling portion 40 is, for example, set equal to that of the base portion 32. The thickness of the intermediate coupling portion 40 can be, for example, about 2 mm to 3 mm. A dimension in the width direction of the intermediate coupling portion 40 is, for example, set equal to that of the base portion 32.

(Configuration of Positioning Marks 41)

Groove-like positioning marks 41 for positioning the tip of the shrinkable tube 70 (see FIG. 2A) are, for example, formed in the upper surface 30A of the intermediate coupling portion 40. A plurality of (two in this embodiment) of the positioning marks 41 are, for example, formed at a predetermined distance from each other in the longitudinal direction of the intermediate coupling portion 40. Each positioning mark 41 is formed closer to the terminal connecting portion 50 than the positioning marks 34 of the base portion 32. Each positioning mark 41 is, for example, formed to linearly extend along the width direction of the intermediate coupling portion 40. Each positioning mark 41 is, for example, formed to linearly extend in a widthwise part of the intermediate coupling portion 40. That is, a length in the width direction of each positioning mark 41 is set shorter than the entire length in the width direction of the intermediate coupling portion 40. The length in the width direction of each positioning mark 41 is, for example, equal to that of the positioning marks 41. The plurality of positioning marks 41 are, for example, formed to extend in parallel to each other. As shown in FIG. 2A, each positioning mark 41 is formed to be recessed downward from the upper surface 30A of the intermediate coupling portion 40. A depth of each positioning mark 41 can be, for example, about 0.1 mm to 0.2 mm. The outer periphery of the intermediate coupling portion 40 is, for example, partially surrounded by the shrinkable tube 70. At this time, the tip of the shrinkable tube 70 is positioned to be arranged between the two positioning marks 41 in the longitudinal direction of the intermediate coupling portion 40.

(Configuration of Groove Portions 42)

The intermediate coupling portion 40 includes groove portions 42 formed in both upper and lower surfaces in a part closer to the terminal connecting portion 50 than the wire connecting portion 31. The groove portions 42 are formed in both upper and lower surfaces of a part of the intermediate coupling portion 40 exposed from the shrinkable tube 70. Each groove portion 42 is formed closer to the terminal connecting portion 50 than the positioning marks 41. Each groove portion 42 is, for example, provided at predetermined distances from the positioning marks 41 in the longitudinal direction of the intermediate coupling portion 40. The groove portions 42 include a groove portion 42A formed in the upper surface of the intermediate coupling portion 40 and a groove portion 42B formed in the lower surface 30B of the intermediate coupling portion 40.

Figure 2B:
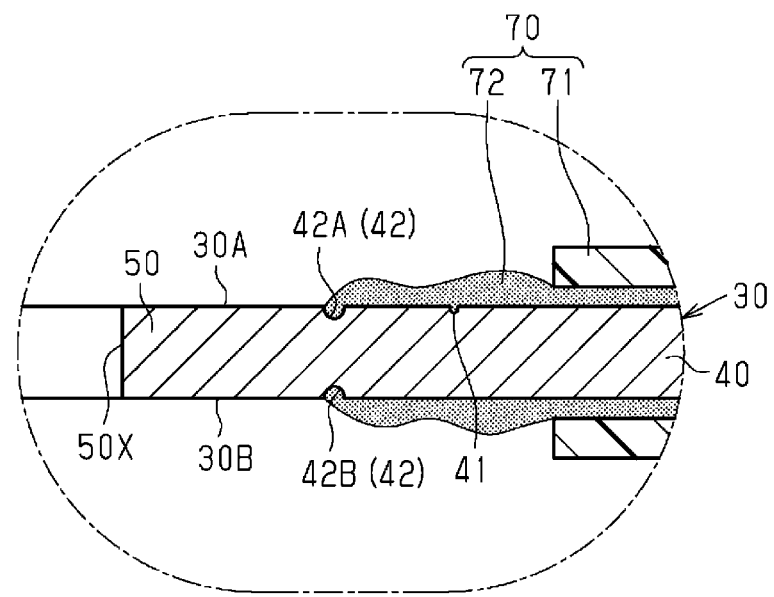

As shown in FIG. 2B, the groove portion 42A is formed to be recessed downward from the upper surface 30A of the intermediate coupling portion 40. The groove portion 42B is formed to be recessed upward from the lower surface 30B of the intermediate coupling portion 40. The groove portions 42A, 42B are, for example, formed to be deeper than the positioning marks 41. Depths of the groove portions 42A, 42B can be, for example, about 0.3 mm to 0.6 mm. The groove portions 42A, 42B are, for example, formed to have an arcuate or U-shaped cross-sectional shape. Inner wall surfaces of the groove portions 42A, 42B are, for example, formed into curved surfaces.

For example, a dimension (i.e. width) of each groove portion 42A, 42B along the longitudinal direction of the intermediate coupling portion 40 is, for example, longer than those of the positioning marks 41 along the longitudinal direction of the intermediate coupling portion 40. That is, each groove portion 42A, 42B is formed to be wider than the positioning marks 41. The groove portions 42A, 42B are formed to overlap each other in a plan view from above the intermediate coupling portion 40. Note that, in this specification, a "plan view" means a view of an object viewed from a normal direction to the upper surface 30A of the connection terminal 30 and a "planar shape" means the shape of the object viewed from the normal direction to the upper surface 30A of the connection terminal 30.

As shown in FIGS. 3 and 4, each groove portion 42 is, for example, formed to extend over the entire length in the width direction of the intermediate coupling portion 40. A dimension of each groove portion 42 along the longitudinal direction of the intermediate coupling portion 40 is longer than those of the positioning marks 41. Each groove portion 42 is formed to linearly extend along the width direction of the intermediate coupling portion 40. That is, each groove portion 42 is formed to have a planar shape linearly extending along the width direction of the intermediate coupling portion 40. Each groove portion 42 is, for example, formed to extend in parallel to the positioning marks 41.

(Configuration of Inclined Surfaces 45)

As shown in FIG. 3, the intermediate coupling portion 40 has inclined surfaces 45 formed on both widthwise end parts thereof. The inclined surfaces 45 are formed to extend from the respective groove portions 42 toward the wire connecting portion 31. The inclined surfaces 45 include inclined surfaces 45A formed on corner parts between the upper surface 30A and the side surfaces 30C of the intermediate coupling portion 40 and inclined surfaces 45B formed on corner parts between the lower surface 30B and the side surfaces 30C of the intermediate coupling portion 40. The inclined surface 45 is formed to be inclined toward a central part in the thickness direction of the intermediate coupling portion 40 as extending from an inner side toward an outer side in the width direction of the intermediate coupling portion 40. Specifically, the inclined surface 45A formed on the corner part between the upper surface 30A and the side surface 30C of the intermediate coupling portion 40 is formed to be inclined downward from the inner side toward the outer side in the width direction of the intermediate coupling portion 40. Further, the inclined surface 45B formed on the corner part between the lower surface 30B and the side surface 30C of the intermediate coupling portion 40 is formed to be inclined upward from the inner side toward the outer side in the width direction of the intermediate coupling portion 40. The inclined surface 45A is formed, for example by chamfering the corner part between the upper surface 30A and the side surface 30C of the intermediate coupling portion 40. The inclined surface 45B is formed, for example by chamfering the corner part between the lower surface 30B and the side surface 30C of the intermediate coupling portion 40.

The inclined surfaces 45A, 45B described above are, for example, formed only on a side closer to the wire connecting portion 31 than the respective groove portions 42. That is, the inclined surfaces 45A, 45B are not formed on a side closer to the terminal connecting portion 50 than the respective groove portions 42.

(Configuration of Terminal Connecting Portion 52)

As shown in FIG. 2A, the terminal connecting portion 50 is formed to be exposed from the shrinkable tube 70 and project outward from the shrinkable tube 70. The terminal connecting portion 50 is, for example, in the form of a flat plate. A thickness of the terminal connecting portion 50 is, for example, set equal to those of the intermediate coupling portion 40 and the base portion 32. The thickness of the terminal connecting portion 50 can be, for example, about 2 mm to 3 mm. As shown in FIG. 3, a dimension in the width direction of the terminal connecting portion 50 is, for example, set equal to those of the intermediate coupling portion 40 and the base portion 32. The terminal connecting portion 50 is, for example, formed with a through hole 50X into which a fixing device (not shown) such as a screw is inserted. The through hole 50X is, for example, formed to penetrate through the terminal connecting portion 50 in a plate thickness direction (here, vertical direction). Note that the terminal connecting portion 50 may be formed into another shape such as a plate shape or bar shape having no through hole 50X.

(Configuration of Shrinkable Tube 70)

As shown in FIG. 2A, the shrinkable tube 70 is, for example, formed into an elongated tube. The shrinkable tube 70 is, for example, formed to cover the connected part 60 of the wire connecting portion 31 and the core 21.

The shrinkable tube 70 includes a tubular heat shrinkable tube 71 and an adhesive formed on the inner peripheral surface of the heat shrinkable tube 71.

The heat shrinkable tube 71 is, for example, formed as a tubular body (e.g. hollow cylindrical body) already in a state before the connected part 60 is arranged inside the shrinkable tube 70. The heat shrinkable tube 71 is, for example, obtained by cooling a resin member molded into a very thin tubular shape by extrusion molding and stretched into a thick tube in a heated state. The heat shrinkable tube 71 obtained in this way has shape memory characteristics of being shrunk to the thin tubular shape before being stretched when being heated. A synthetic resin such as a polyolefin-based resin, polyester-based resin, nylon-based resin, silicon-based resin or fluororesin can be, for example, used as a material of the heat shrinkable tube 71. One material can be singly used or two or more materials can be appropriately combined and used as the material of the heat shrinkable tube 71.

The adhesive 72 is formed to have a uniform thickness on the inner peripheral surface of the heat shrinkable tube 71 and formed into a tubular shape (e.g. hollow cylindrical shape) in the state before the connected part 60 is arranged inside the shrinkable tube 70. The adhesive 72 is, for example, formed over the entire circumference and entire length of the inner peripheral surface of the heat shrinkable tube 71. The adhesive 72 has, for example, an inner diameter larger than an outer diameter of the connected part 60 and an outer diameter of the insulation coating 22 in a state before the connected part 60, the end part of the insulation coating 22 and the like are arranged inside. A thermoplastic adhesive can be, for example, used as the adhesive 72. A modified olefin-based or polyester-based hotmelt adhesive can be, for example, used as the adhesive 72. A material of the adhesive 72 is preferably the same type of resin material as the material constituting the insulation coating 22. Further, the material of the adhesive 72 is preferably the same type of resin material as the material constituting the heat shrinkable tube 71. One material can be singly used or two or more materials can be appropriately combined and used as the material of the adhesive 72. Note that the adhesive 72 is, for example, a layer formed by being cooled and solidified after being melted by heating.

Next, the structures of the heat shrinkage tube 71 and the adhesive 72 after thermal shrinkage are described.

The heat shrinkable tube 71 is, for example, formed to cover the core 21 exposed from the insulation coating 22. The heat shrinkage tube 71 is, for example, formed to cover from the end part of the insulation coating 22 to the connected part 60. The heat shrinkage tube 71 is, for example, formed to cover the coating connecting portions 33 and the base portion 32 fixed to the insulation coating 22. The heat shrinkage tube 71 is, for example, formed to cover from the connected part 60 to the wire connecting portion 31 located closer to the terminal connecting portion 50 than the connected part 60. The heat shrinkage tube 71 is, for example, formed to cover a part in the longitudinal direction of the intermediate coupling portion 40. The heat shrinkage tube 71 is so provided that a tip part (i.e. end part on the side of the terminal connecting portion 50) thereof is arranged between the pair of positioning members 41 of the intermediate coupling portion 40.

The heat shrinkage tube 71 is, for example, formed to surround the outer peripheral surface of the end part of the insulation coating 22 and the outer peripheral surface of the connected part 60 over the entire periphery in the circumferential direction. The heat shrinkage tube 71 is, for example, formed to surround the outer peripheral surface of the wire connecting portion 31 and the outer peripheral surface of the part in the longitudinal direction of the intermediate coupling portion 40 over the entire periphery in the circumferential direction. The heat shrinkage tube 71 is, for example, formed with steps along steps formed by the outer peripheral surface of the insulation coating 22, the coating connecting portions 33, the core 21 exposed from the insulation coating 22, the connected part 60 and the wire connecting portion 31. For example, the heat shrinkage tube 71 is so formed that an outer diameter of a part covering the connected part 60 is smaller than that of a part covering the outer peripheral surface of the insulation coating 22. For example, the heat shrinkage tube 71 is so formed that an outer diameter of a part covering the wire connecting portion 31 and the intermediate coupling portion 40 located closer to the terminal connecting portion 50 than the connected part 60 is smaller than that of the part covering the connected part 60.

For example, a rear end part (i.e. end part on the side of the wire connecting portion 31) of the heat shrinkage tube 71 covers the outer peripheral surface of the end part of the insulation coating 22 and a tip part (i.e. end part on the side of the terminal connecting portion 50) of the heat shrinkage tube 71 covers the outer peripheral surface of the intermediate coupling portion 40 of the connection terminal 30. The rear end part in the longitudinal direction of the heat shrinkage tube 71 is, for example, bonded to the outer peripheral surface of the end part of the insulation coating 22 over the entire periphery in the circumferential direction by the adhesive 72. For example, the adhesive 72 in a rear end part in the longitudinal direction of the shrinkage tube 70 is bonded to the outer peripheral surface of the end part of the insulation coating 22 over the entire periphery in the circumferential direction without any clearance, and bonded to the inner peripheral surface of the heat shrinkage tube 71 over the entire periphery in the circumferential direction without any clearance. Further, the tip part in the longitudinal direction of the heat shrinkage tube 71 is, for example, bonded to the outer peripheral surface of the intermediate coupling portion 40 over the entire periphery in the circumferential direction without any clearance. For example, the adhesive 72 in a tip part in the longitudinal direction of the shrinkage tube 70 is bonded to the outer peripheral surface of the end part of the intermediate coupling portion 40 over the entire periphery in the circumferential direction without any clearance, and bonded to the inner peripheral surface of the heat shrinkage tube 71 over the entire periphery in the circumferential direction without any clearance. By these, a clearance between the heat shrinkage tube 71 and the insulation coating 22 is closed and a clearance between the heat shrinkage tube 71 and the intermediate coupling portion 40 is closed. Thus, it is possible to suppress the intrusion of a liquid such as water into the shrinkage tube 70 from the end parts in the longitudinal direction of the shrinkage tube 70. As a result, it is possible to suppress the intrusion of the liquid to the connected part 60 of the core 21 of the wire 20 and the wire connecting portion 31 of the connection terminal 30. That is, the shrinkage tube 70 of this embodiment has an insulating/protecting function to insulate/protect the connected part 60 and a water cut-off function to stop the intrusion of water to the connected part 60.

The adhesive 72 is, for example, formed to fill up clearances between the inner peripheral surface of the heat shrinkage tube 71 and the outer peripheral surfaces of the core 21 and the connection terminal 30 in an intermediate part in the longitudinal direction of the shrinkage tube 70. Note that the adhesive 72 may be formed along the inner peripheral surface of the heat shrinkage tube 71 in the intermediate part in the longitudinal direction of the shrinkage tube 70.

As shown in FIG. 2B, the adhesive 72 is, for example, formed to project outward from the tip part of the heat shrinkage tube 71. That is, the adhesive 72 is formed to flow out to the outside of the heat shrinkage tube 71. The adhesive 72 projecting outward from the heat shrinkage tube 71 spreads on the surface of the intermediate coupling portion 40 from the tip part of the heat shrinkage tube 71 toward the terminal connecting portion 50. At this time, the upper and lower surfaces 30A, 30B of the intermediate coupling portion 40 are formed with the groove portions 42 to partition between the terminal connecting portion 50 and the intermediate coupling portion 40. The adhesive 72 flowing out to the outside of the heat shrinkage tube 71 is pooled in the groove portions 42. In other words, the adhesive 72 flowing out to the outside of the heat shrinkage tube 71 is held back in the groove portions 41. In this way, the groove portions 42 function as dam portions for holding back the adhesive 72 flowing out to the outside of the heat shrinkage tube 71.

(Manufacturing Method of Wiring Harness 10)

Figure 6:
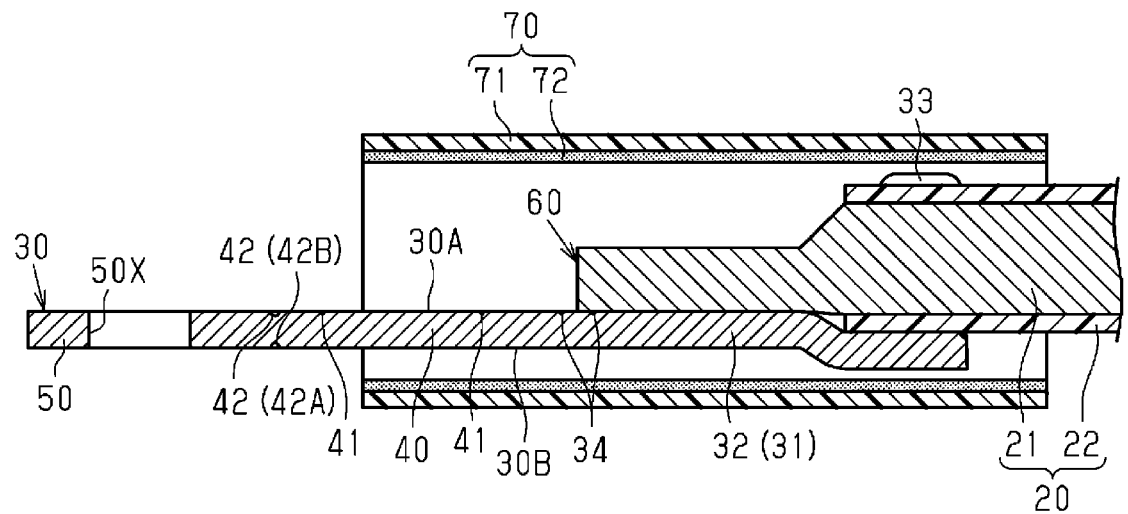
FIG. 6 is a schematic section showing the method for manufacturing the wiring harness of the one embodiment.
Figure 7:
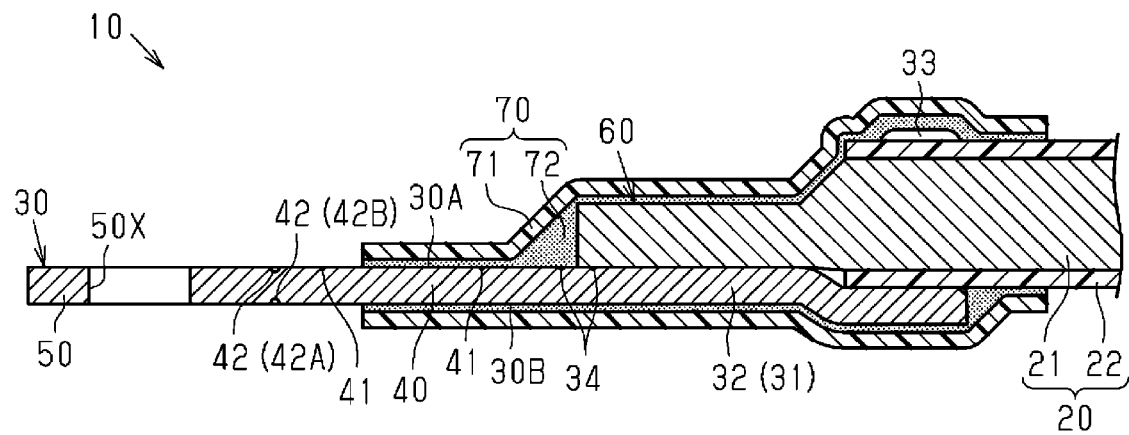
FIG. 7 is a schematic section showing the method for manufacturing the wiring harness of the one embodiment.

Next, a manufacturing method of the wiring harness 10 is described with reference to FIGS. 5 to 7.

Figure 5:
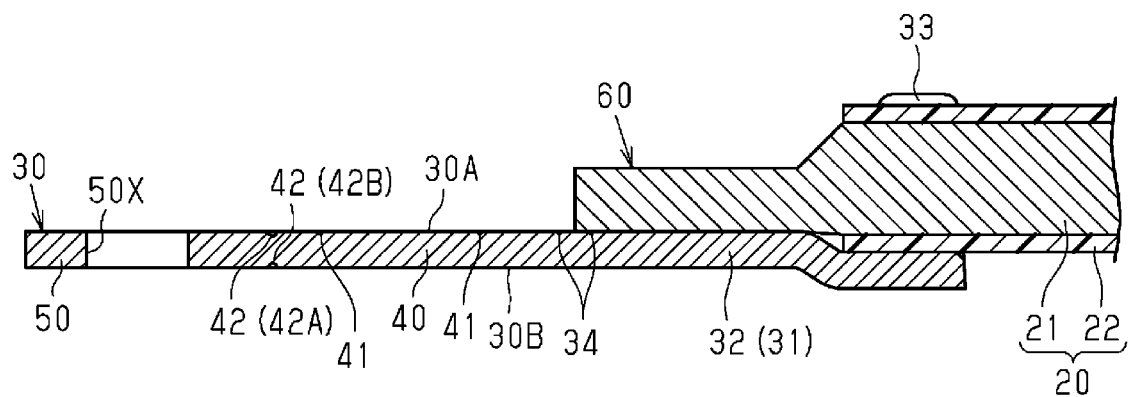
FIG. 5 is a schematic section showing a method for manufacturing the wiring harness of the one embodiment.

First, in a step shown in FIG. 5, the wire 20 having the wire connecting portion 31 of the connection terminal 30 electrically connected to the end part of the core 21 is prepared. In this embodiment, the wire connecting portion 31 is connected to the core 21 by ultrasonic welding. In particular, the core 21 is so placed on the upper surface 30A of the base portion 32 of the wire connecting portion 31 that the tip of the core 21 exposed from the insulation coating 22 is arranged between the pair of positioning members 34 of the wire connecting portion 31. At this time, the end part of the insulation coating 22 is arranged between the pair of coating connecting portions 33 of the wire connecting portion 31. Subsequently, the coating connecting portions 33 are crimped and fixed to the end part of the insulation coating 22 and the wire connecting portion 31 and the core 21 are joined by ultrasonic welding. At this time, whether or not the tip part of the core 21 after joining is arranged between the pair of positioning members 34 is confirmed, whereby it can be easily discriminated whether or not the wire 20 is arranged at a desired position.

Subsequently, in a step shown in FIG. 6, the shrinkage tube 70 before shrinkage is prepared. The shrinkage tube 70 before shrinkage has a laminated structure including the tubular (here, hollow cylindrical) heat shrinkage tube 71 and the thermoplastic adhesive 72 formed on the inner peripheral surface of the heat shrinkage tube 71. This shrinkage tube 70 before shrinkage is formed to have such an inner diameter that the insulation coating 22, the connected part 60 and the wire connecting portion 31 can be accommodated inside.

Subsequently, the end part of the wire 20 connected to the connection terminal 30 is inserted into the shrinkable tube 70. Specifically, the wire 20 connected to the connection terminal 30 is so inserted into the shrinkable tube 70 that the outer periphery of the end part of the insulation coating 22 fixed to the coating connecting portions 33, the outer periphery of the core 21 exposed from the insulation coating 22, the outer periphery of the connected part 60, the outer periphery of the wire connecting portion 31 and the outer periphery of the intermediate coupling portion 40 are surrounded by the shrinkable tube 70. At this time, the shrinkable tube 70 is so positioned that the end part of the shrinkable tube 70 on the side of the terminal connecting portion 50 is arranged between the pair of positioning marks 41 of the intermediate coupling portion 40.

Subsequently, heating is applied to the shrinkable tube 70. For example, the shrinkable tube 70 is heated by a heater or the like. In this heating process, the shrinkable tube 70 is heated at a heating temperature (e.g. about 120° C. to 140° C.) higher than a shrinkage temperature of the heat shrinkable tube 71 and lower than a melting temperature of the heat shrinkable tube 71 only for a predetermined time. By this heating process, the heat shrinkable tube 71 shrinks in radial and longitudinal directions and the thermoplastic adhesive 72 is softened or melted, whereby the adhesive 72 exhibits adhesion. In this way, as shown in FIG. 7, the heat shrinkable tube 71 is bonded to the outer peripheral surface of the end part of the insulation coating 22 without any clearance over the entire periphery in the circumferential direction by the adhesive 72 and bonded to the outer peripheral surface of the end part of the intermediate coupling portion 40 without any clearance over the entire periphery in the circumferential direction by the adhesive 72. Such a shrinkable tube 70 after shrinkage can function as a water cut-off member for stopping water intrusion to the connected part 60. At this time, whether or not the heat shrinkable tube 71 is arranged at the desired position can be easily discriminated by confirming whether or not the tip part of the heat shrinkable tube 71 after shrinkage is arranged between the pair of positioning marks 41.

Further, in this process, the adhesive 72 may flow out to the outside of the heat shrinkable tube 71. The adhesive 72 flowing out to the outside of the heat shrinkable tube 71 spreads, for example, from the tip part of the heat shrinkable tube 71 toward the terminal connecting portion 50 on the surface of the intermediate coupling portion 40. At this time, the groove portions 42 are formed in the upper and lower surfaces 30A, 30B of the intermediate coupling portion 40 to partition between the terminal connecting portion 50 and the intermediate coupling portion 40. The spread of the adhesive 72 can be blocked by these groove portions 42. In this way, the flow of the adhesive 72 flowing out to the outside of the heat shrinkable tube 71 to the terminal connecting portion 50 can be suppressed.

Next, functions and effects of this embodiment are described.

(1) The wiring harness 10 includes the wire 20 having the core 21 and the insulation coating 22 covering the outer periphery of the core 21, the connection terminal 30 to be electrically connected to the core 21 exposed from the insulation coating 22, and the tubular shrinkable tube 70 for covering the connected part 60 of the core 21 and the connection terminal 30. The connection terminal 30 includes the wire connecting portion 31 to be electrically connected to the core 21 of the wire 20, the terminal connecting portion 50 to be connected to the mating terminal, and the intermediate coupling portion 40 provided between the wire connecting portion 31 and the terminal connecting portion 50 for linking the wire connecting portion 31 and the terminal connecting portion 50. The intermediate coupling portion 40 includes the groove portions 42 formed in both upper and lower surfaces of the part exposed from the heat shrinkable tube 71 of the shrinkable tube 70.

According to this configuration, the groove portions 42 are formed in the both upper and lower surfaces of the intermediate coupling portion 40 provided between the wire connecting portion 31 and the terminal connecting portion 50. In this way, the flowing-out adhesive 72 can be pooled in the groove portions 42 and the flow of the adhesive 72 can be blocked by these groove portions 42, for example, if the adhesive 72 flows out from the shrinkable tube 70 covering the connected part 60 of the wire connecting portion 31 and the core 21. In this way, the flow of the adhesive 72 to the terminal connecting portion 50 can be suppressed. As a result, a reduction in the connection reliability of the terminal connecting portion 50 and the mating terminal can be suppressed.

(2) The groove portions 42 include the groove portion 42A formed in the upper surface 30A of the intermediate coupling portion 40 and the groove portion 42B formed in the lower surface 30B of the intermediate coupling portion 40. The groove portions 42A, 42B are formed to overlap each other in the plan view from the normal direction to the upper surface 30A of the intermediate coupling portion 40. According to this configuration, the flow of the adhesive 72 can be blocked by the groove portions 42A, 42B formed at the positions overlapping each other in the plan view. Thus, the flow of the adhesive 72 can be blocked at the same position on the both upper and lower surfaces of the intermediate coupling portion 40 in the plan view. That is, the flow of the adhesive 72 can be blocked at the same position in the longitudinal direction on the upper and lower surfaces 30A, 30B of the intermediate coupling portion 40.

(3) The groove portions 42 are formed to extend over the entire length in the width direction of the intermediate coupling portion 40. According to this configuration, the flow of the adhesive 72 can be blocked over the entire length in the width direction of the intermediate coupling portion 40 by the groove portions 42. In this way, the flow of the adhesive 72 to the terminal connecting portion 50 can be suitably suppressed.

(4) The intermediate coupling portion 40 includes the groove-like positioning marks 41 provided to position the tip of the heat shrinkable tube 71. The groove portions 42 are provided closer to the terminal connecting portion 50 than the positioning marks 41.

According to this configuration, in mounting the shrinkable tube 70 on the connection terminal 30 and the wire 20, the tip of the heat shrinkable tube 71 can be easily positioned by aligning the heat shrinkable tube 71 using the positioning marks 41. Further, since the groove portions 42 are provided closer to the terminal connecting portion 50 than the positioning marks 41, the flow of the adhesive 72 flowing out from the tip of the heat shrinkable tube 71 can be suitably blocked by the groove portions 42.

(5) The groove portions 42 are formed to be deeper than the positioning marks 41. According to this configuration, since the groove portions 42 are formed to be deep, the flow of the adhesive 72 can be suitably blocked by those groove portions 42.

(6) The dimensions in the longitudinal direction of the groove portions 42 are set larger than those of the positioning marks 41. According to this configuration, since the groove portions 42 are formed to be wide, the flow of the adhesive 72 can be suitably blocked by those groove portions 42.

(7) The dimensions in the width direction of the positioning marks 41 are set smaller than those of the groove portions 42. According to this configuration, the lengths in the width direction of the groove portions 42 and those of the positioning marks 41 are different from each other. Thus, the groove portions 42 and the positioning marks 41 can be easily discriminated.

(8) The inclined surfaces 45A inclined downward from the inner side toward the outer side in the width direction of the intermediate coupling portion 40 are formed on the corner parts between the upper surface 30A and the side surfaces 30C of the intermediate coupling portion 40. The inclined surfaces 45B inclined upward from the inner side toward the outer side in the width direction of the intermediate coupling portion 40 are formed on the corner parts between the lower surface 30B and the side surfaces 30C of the intermediate coupling portion 40. The inclined surfaces 45A, 45B are formed to extend from the groove portions 42 toward the wire connecting portion 31.

According to this configuration, by forming the inclined surfaces 45A, 45B on the corner parts of the intermediate coupling portion 40, the adhesive 72 more easily spreads on the inclined surfaces 45A, 45B as compared to corner parts not formed with the inclined surfaces 45A, 45B. In this way, the adhesive 72 held back in the groove portions 42 can be caused to spread toward the wire connecting portion 31 through the inclined surfaces 45A, 45B. Thus, the flow of the adhesive 72 to the terminal connecting portion 50 can be suitably suppressed.

Other Embodiments

The above embodiment can be modified and carried out as follows. The above embodiment and the following modifications can be carried out in combination without technically contradicting each other.

Although the planar shape of each groove portion 42 linearly extends along the width direction of the intermediate coupling portion 40 in the above embodiment, the planar shape of each groove portion 42 is not limited to this.

Figure 8:
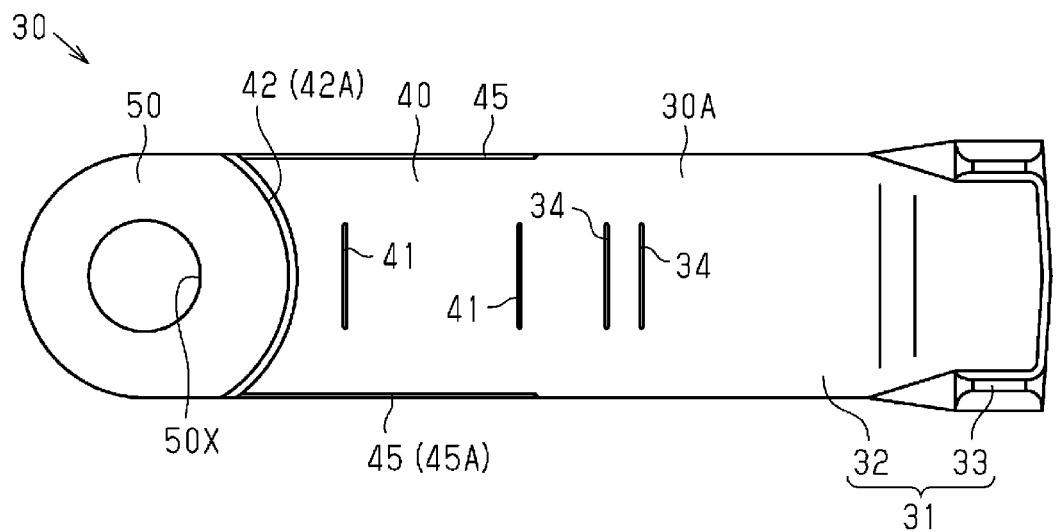
FIG. 8 is a schematic plan view showing a connection terminal of a modification.

For example, as shown in FIG. 8, the planar shape of each groove portion 42 may be curved. For example, the planar shape of each groove portion 42 may be an arc shape curved along the outer shape of the through hole 50X of the terminal connecting portion 50. In other words, the planar shape of each groove portion 42 of this modification is curved to come closer to the terminal connecting portion 50 from the widthwise central part toward the widthwise outer sides of the intermediate coupling portion 40.

Further, the planar shape of each groove portion 42 may be curved to come closer to the wire connecting portion 31 from the widthwise central part toward widthwise outer sides of the intermediate coupling portion 40. The planar shape of each groove portion 42 may be, for example, a V shape.

Note that, in the case of ultrasonically welding the wire connecting portion 31 and the core 21 (see FIG. 2A) of the wire 20, the planar shape of each groove portion 42 is preferably a shape free from corner parts such as the arc shape shown in FIG. 8.

In the above embodiment, the planar shape of the groove portion 42A and that of the groove portion 42B may be different from each other.

Although the groove portions 42A, 42B are formed to overlap each other in the plan view in the above embodiment, there is not limitation to this. For example, the groove portions 42A, 42B may be formed at positions shifted from each other in the plan view. That is, the groove portions 42A, 42B may be provided at positions different from each other in the longitudinal direction of the intermediate coupling portion 40.

Each groove portion 42 of the above embodiment may be formed to have a V-shaped or rectangular cross-sectional shape.

In the above embodiment, the dimensions of the groove portions 42 in the width direction of the intermediate coupling portion 40 and those of the positioning marks 41 in the width direction of the intermediate coupling portion 40 may be set equal.

In the above embodiment, the dimensions of the groove portions 42 in the width direction of the intermediate coupling portion 40 may be set shorter than the entire length in the width direction of the intermediate coupling portion 40.

In the above embodiment, the widths of the groove portions 42 in the longitudinal direction of the intermediate coupling portion 40 and those of the positioning marks 41 in the longitudinal direction of the intermediate coupling portion 40 may be set equal.

In the above embodiment, the depths of the groove portions 42 may be set equal to those of the positioning marks 41.

Although one groove portion 42 is formed in each of the upper and lower surfaces 30A, 30B of the intermediate coupling portion 40 in the above embodiment, the number of the groove portions 42 is not particularly limited. For example, a plurality of the groove portions 42A may be formed in the upper surface 30A of the intermediate coupling portion 40 and/or a plurality of the groove portions 42B may be formed in the lower surface 30B of the intermediate coupling portion 40. At this time, the number of the groove portions 42A formed in the upper surface 30A of the intermediate coupling portion 40 and the number of the groove portions 42B formed in the lower surface 30B of the intermediate coupling portion 40 may be set different.

The inclined surfaces 45A in the connection terminal 30 of the above embodiment may be omitted.

The inclined surfaces 45B in the connection terminal 30 of the above embodiment may be omitted.

The planar shape of the positioning mark 41 in the above embodiment is not particularly limited. For example, the planar shape of the positioning mark 41 may be a dot shape.

The planar shape of the positioning mark 34 in the above embodiment is not particularly limited. For example, the planar shape of the positioning mark 34 may be a dot shape.

The positioning marks 41 in the connection terminal 30 of the above embodiment may be omitted.

The positioning marks 34 in the connection terminal 30 of the above embodiment may be omitted.

The coating connecting portions 33 in the connection terminal 30 of the above embodiment may be omitted.

Although the terminal connecting portion 50 is formed to linearly extend along the longitudinal direction from the end part of the intermediate coupling portion 40 in the above embodiment, the structure of the terminal connecting portion 50 is not limited to this.

Figure 9:
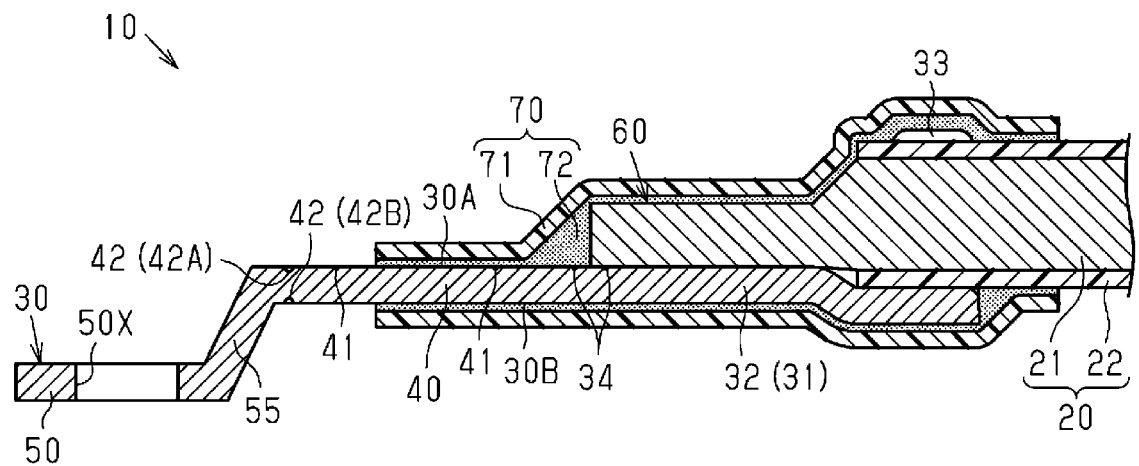
FIG. 9 is a schematic section showing a wiring harness of a modification.

For example, as shown in FIG. 9, the terminal connecting portion 50 may be formed at a position lowered from the intermediate coupling portion 40. The connection terminal 30 in this case includes, for example, a coupling portion 55 connecting the end part of the intermediate coupling portion 40 and the end part of the terminal connecting portion 50. The coupling portion 55 is formed to vertically extend. Specifically, the coupling portion 55 is formed to be inclined obliquely downward away from the intermediate coupling portion 40 in the longitudinal direction of the connection terminal 30 from the end part of the intermediate coupling portion 40 toward the end part of the terminal connecting portion 50. At this time, the lower surface 30B of the terminal connecting portion 50 is located below the outer peripheral surface located at the lowermost position of the heat shrinkable tube 71. The groove portions 42 in this case are, for example, provided closer to the wire connecting portion 31 than the coupling portion 55.

An electromagnetic shield member may be provided inside the exterior member 25 in the above embodiment. The electromagnetic shield member is, for example, provided between the inner peripheral surface of the exterior member 25 and the outer peripheral surface of the wire 20. A flexible braided wire or metal foil can be, for example, used as the electromagnetic shield member.

In the above embodiment, the number of the wires 20 provided in the wiring harness 10 is not particularly limited and the number of the wires 20 can be changed according to the specification of the vehicle V. For example, low-voltage wires for connecting a low-voltage battery and various low-voltage devices (e.g. lamps, car audio system) may be added as wires provided in the wiring harness 10.

An arrangement relationship of the inverter 11 and the high-voltage battery 12 in the vehicle V is not limited to the one in the above embodiment and may be changed as appropriate according to the vehicle configuration.

Figure 10:
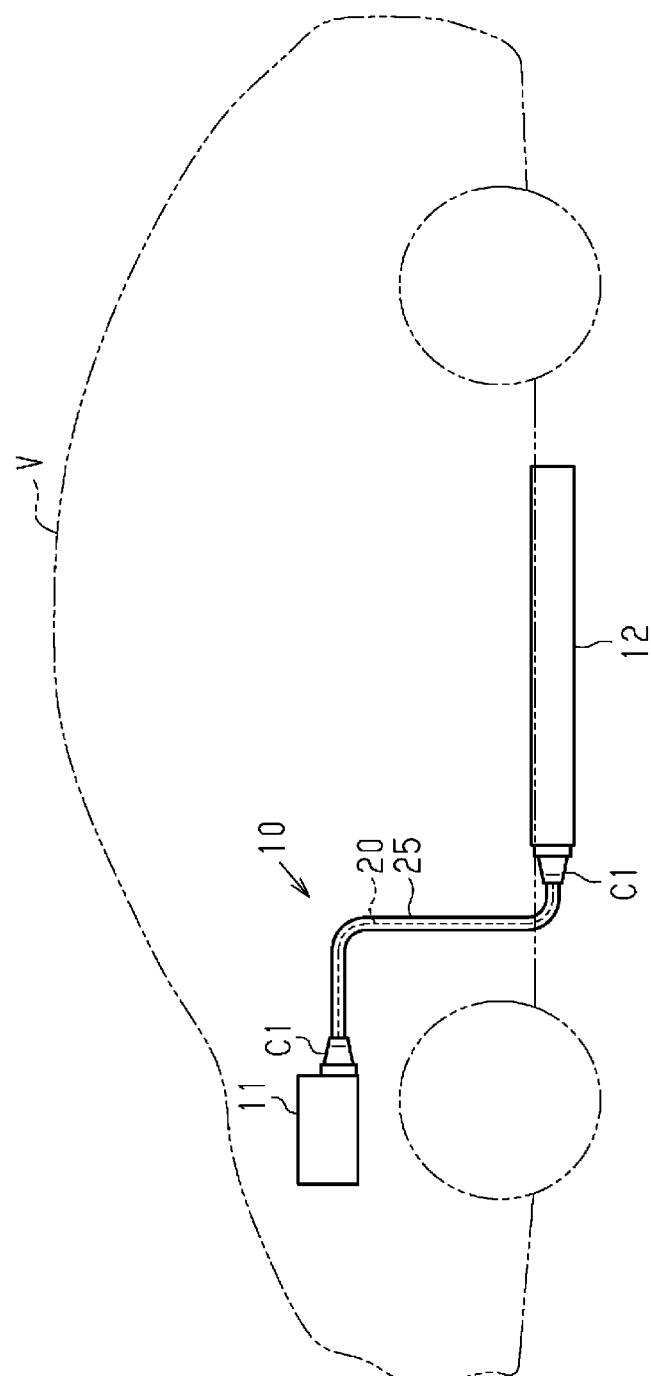
FIG. 10 is a schematic configuration diagram showing a wiring harness of a modification.

For example, as shown in FIG. 10, the high-voltage battery may be arranged substantially over the entire floor of the vehicle V.

Although the inverter 11 and the high-voltage battery 12 are adopted as electrical devices to be connected by the wire(s) 20 in the above embodiment, there is no limitation to this. For example, wires may be adopted to connect the invertor 11 and a motor for vehicle drive. That is, wires are applicable in any occasion to electrically connect electrical devices installed in a vehicle.

Although the high-voltage wire is embodied as the wire 20 in the above embodiment, a low-voltage wire may be embodied as the wire 20.

The present disclosure includes the following implementation examples. Reference signs of several constituent elements of illustrative embodiments are given not for limitation, but for understanding assistance. Matters described in the following implementation examples may be partly omitted or several of the matters described in the implementation examples may be selected or extracted and combined.

[Addendum 1] A wiring harness (10) according to one or more implementation examples of the present disclosure can include:
 a metal terminal (30) having a base end connecting part (31) and a tip connecting part (50);
 a wire (20) having a conductive tip (21) connected to the base end connecting part (31) of the metal terminal (30) with an overlapping part (60);
 a heat shrinkable tube (71) having a tip opening, a base end opening and an inner peripheral surface extending from the tip opening to the base end opening and configured to surrounding the overlapping part (60); and
 an adhesive (72) for bonding the inner peripheral surface of the heat shrinkable tube (71) to the overlapping part (60),
 wherein the metal terminal (30) can include a flow limiting recess (42) formed at a predetermined position between the tip connecting part (50) of the metal terminal (30) and the tip opening of the heat shrinkable tube (71) and configured to limit the flow of the adhesive (72) from the tip opening of the heat shrinkable tube (71) toward the tip connecting part (50) of the metal terminal (30).

According to this implementation example, if the adhesive (72) fluid before being solidified or cured flows out from the tip opening of the heat shrinkable tube (71) and flows toward the tip connecting part (50) of the metal terminal (30), part of the adhesive (72) can be pooled in the flow limiting recess (42). By the surface tension of the adhesive (72) fluid before being solidified or cured, the adhesive (72) stays at the position of the flow limiting recess (42) with a thickness exceeding a depth of the flow limiting recess (42). Therefore, the adhesive (72) having a volume exceeding a capacity of the flow limiting recess (42) stays at the position of the flow limiting recess (42). A movement of the adhesive (72) toward the tip connecting part (50) beyond the flow limiting recess (42) can be suppressed by the flow limiting recess (42) having a relatively small capacity such as a narrow groove.

[Addendum 2] In several implementation examples of the present disclosure,
 the metal terminal (30) has a first surface (30A) extending from the base end connecting part (31) to the tip connecting part (50) and a second surface (30B) opposite to the first surface (30A), and
 the flow limiting recesses (42) include a first flow limiting recess (42A) formed in the first surface (30A) of the metal terminal (30) and a second flow limiting recess (42B) formed in the second surface (30B) of the metal terminal (30).

[Addendum 3] In several implementation examples of the present disclosure, the flow limiting recess (42) may be a groove extending over the entire width of the metal terminal (30).

[Addendum 4] In several implementation examples of the present disclosure,
 the metal terminal (30) can have two side surfaces for connecting the first surface (30A) and the second surface (30B), and
 the flow limiting recess (42) can be open in or communicate with each of the two side surfaces of the metal terminal (30).

[Addendum 5] In several implementation examples of the present disclosure, the metal terminal (30) can include at least one first positioning mark (41) formed at at least one first position between the flow limiting recess (42) and the tip opening of the heat shrinkable tube (71) and configured to position the heat shrinkable tube (71) in the first surface (30A).

[Addendum 6] In several implementation examples of the present disclosure, the metal terminal (30) can include at least one second positioning mark (34) formed between the at least one first positioning mark (41) and the base end connecting part (31) and configured to position the conductive tip (21) of the wire (20) in the first surface (30A).

[Addendum 7] In several implementation examples of the present disclosure, the at least one first positioning mark (41) and the at least one second positioning mark (34) are not formed in the second surface (30B).

[Addendum 8] In several implementation examples of the present disclosure,
the flow limiting recess (42) can have a predetermined groove width and a predetermined groove depth, and
each of the at least one first positioning mark (41) and the at least one second positioning mark (34) may be a groove having a first groove depth smaller than the predetermined groove depth.

[Addendum 9] In several implementation examples of the present disclosure, the adhesive (72) may be configured as a water cut-off seal.

The embodiment disclosed this time should be considered illustrative in all aspects, rather than illustrative. The scope of the present invention is represented not by the above meaning, but by claims and is intended to include all changes in the scope of claims and in the meaning and scope of equivalents.

LIST OF REFERENCE NUMERALS 10 wiring harness
11 inverter
12 high-voltage battery
20 wire
21 core
22 insulation coating
25 exterior member
30 connection terminal
30A upper surface
30B lower surface
30C side surface
31 wire connecting portion
32 base portion
33 coating connecting portion
34 positioning mark
40 intermediate coupling portion
41 positioning mark
42 groove portion
42A groove portion (first groove portion)
42B groove portion (second groove portion)
45 inclined surface
45A inclined surface (first inclined surface)
45B inclined surface (second inclined surface)
50 terminal connecting portion
50X through hole
55 coupling portion
60 connected part
70 shrinkable tube
71 heat shrinkable tube
72 adhesive
C1 connector
V vehicle

What is claimed is:

1. A connection terminal, comprising:
a wire connecting portion to be electrically connected to a wire;
a terminal connecting portion to be connected to a mating terminal; and
an intermediate coupling portion provided between the wire connecting portion and the terminal connecting portion, the intermediate coupling portion linking the wire connecting portion and the terminal connecting portion,
wherein the intermediate coupling portion includes groove portions formed in both upper and lower surfaces of a part closer to the terminal connecting portion than the wire connecting portion,
the groove portions include a first groove portion formed to be recessed downward from the upper surface of the intermediate coupling portion and a second groove portion formed to be recessed upward from the lower surface of the intermediate coupling portion, and
the first and second groove portions are formed to overlap each other when viewed from a normal direction to the upper surface of the intermediate coupling portion.

2. The connection terminal of claim 1, wherein the groove portions are formed to extend over an entire length of the intermediate coupling portion in a width direction orthogonal to a longitudinal direction as an arrangement direction of the wire connecting portion, the intermediate coupling portion and the terminal connecting portion when viewed from a top.

3. A wiring harness, comprising:
the connection terminal of claim 1;
a wire including a core and an insulation coating covering an outer periphery of the core; and
a tubular shrinkable tube for covering a connected part of the wire and the connection terminal,
wherein:
the shrinkable tube includes a heat shrinkable tube and an adhesive formed on an inner peripheral surface of the heat shrinkable tube,
the core exposed form the insulation coating is electrically connected to the wire connecting portion, and
the groove portions are formed in both upper and lower surfaces of a part of the intermediate coupling portion exposed from the heat shrinkable tube.

4. The wiring harness of claim 3, wherein:
the intermediate coupling portion includes a groove-like positioning mark provided to position a tip of the heat shrinkable tube, and
the groove portions are provided closer to the terminal connecting portion than the positioning mark.

5. The wiring harness of claim 4, wherein the groove portions are formed to be deeper than the positioning mark.

6. The wiring harness of claim 4, wherein,
when an arrangement direction of the wire connecting portion, the intermediate coupling portion and the terminal connecting portion is a longitudinal direction, dimensions along the longitudinal direction of the groove portions are set larger than a dimension along the longitudinal direction of the positioning mark.

7. The wiring harness of claim 4, wherein:
when an arrangement direction of the wire connecting portion, the intermediate coupling portion and the terminal connecting portion is a longitudinal direction and a direction orthogonal to the longitudinal direction when viewed from a top is a width direction, a dimension along the width direction of the positioning mark is set smaller than dimensions along the width direction of the groove portions.

8. The wiring harness of claim 3, wherein:
the intermediate coupling portion has a side surface extending between the upper and lower surfaces, a first inclined surface inclined downward from an inner side toward an outer side in the width direction of the intermediate coupling portion is formed on a corner part between the upper surface and the side surface of the intermediate coupling portion, a second inclined surface inclined upward from the inner side toward the outer side in the width direction of the intermediate coupling portion is formed on a corner part between the lower surface and the side surface of the intermediate coupling portion, and the first and second inclined surfaces are formed to extend from the groove portions toward wire connecting portion.

9. The wiring harness of claim 3, wherein:
the wire is a high-voltage wire, and
the core and the wire connecting portion are joined by ultrasonic welding.

10. The wiring harness of claim 8, wherein the first and second inclined surfaces are formed only on a side closer to the wire connecting portion than each of the groove portions.

11. The wiring harness of claim 8, wherein the first inclined surface is formed by chamfering the corner part between the upper surface and the side surface of the intermediate coupling portion, and the second inclined surface is formed by chamfering the corner part between the lower surface and the side surface of the intermediate coupling portion.

12. The connection terminal of claim 1, wherein inner wall surfaces of the groove portions are formed into curved surfaces.

13. The connection terminal of claim 1, further comprising:
the coupling portion formed to be inclined obliquely downward away from the intermediate coupling portion in a longitudinal direction of the connection terminal from an end part of the intermediate coupling portion toward an end part of the terminal connecting portion.

* * * * *